(12) United States Patent
Kalik (10) Patent No.: US 7,741,962 B2
(45) Date of Patent: Jun. 22, 2010

(54) AUDITORY DISPLAY OF VEHICULAR ENVIRONMENT

(75) Inventor: Steven F. Kalik, Arlington, MA (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 291 days.

(21) Appl. No.: 11/539,704

(22) Filed: Oct. 9, 2006

(65) Prior Publication Data

US 2008/0085686 A1 Apr. 10, 2008

(51) Int. Cl.
*B60Q 1/00* (2006.01)
(52) U.S. Cl. .................. 340/438; 340/435; 340/903
(58) Field of Classification Search ......... 340/438, 340/435, 436, 988, 903; 180/274; 701/301
See application file for complete search history.

(56) References Cited

U.S. PATENT DOCUMENTS

| | | | | |
|---|---|---|---|---|
| 4,528,563 A * | 7/1985 | Takeuchi | ............ | 340/903 |
| 5,450,057 A * | 9/1995 | Watanabe | ............ | 340/435 |
| 5,699,057 A * | 12/1997 | Ikeda et al. | ............ | 340/903 |
| 5,979,586 A * | 11/1999 | Farmer et al. | ............ | 180/274 |
| 6,535,114 B1 * | 3/2003 | Suzuki et al. | ............ | 340/435 |
| 6,731,204 B2 * | 5/2004 | Lehmann | ............ | 340/435 |
| 6,844,826 B2 * | 1/2005 | Yurimoto et al. | ............ | 340/435 |
| 6,864,783 B2 * | 3/2005 | Rao et al. | ............ | 340/435 |
| 6,876,298 B2 * | 4/2005 | Litkouhi et al. | ............ | 340/435 |
| 6,885,968 B2 | 4/2005 | Breed et al. | | |
| 7,095,315 B2 * | 8/2006 | Lemke | ............ | 340/435 |
| 7,274,288 B2 * | 9/2007 | Nagata | ............ | 340/438 |
| 7,327,235 B2 * | 2/2008 | Nagata | ............ | 340/435 |
| 2002/0005778 A1 | 1/2002 | Breed et al. | | |
| 2005/0099291 A1 | 5/2005 | Landau | | |

OTHER PUBLICATIONS

M. Grohn, T. Lokki, and T. Takala. "Comparison of auditory, visual, and audio-visual navigation in a 3-D space." *Proceedings of the 2003 International Conference on Auditory Display*, Boston, MA, USA, Jul. 6-9, 2003.

* cited by examiner

*Primary Examiner*—John A Tweel, Jr.
(74) *Attorney, Agent, or Firm*—Gifford, Krass, Sprinkle, Anderson & Citkowski, P.C.

(57) ABSTRACT

An example apparatus for providing an audible signal representative of an environment comprises a sensor system, and an audio system providing an audible signal to a person. The audible signal has one or more audible signal variables from which the person can determine, for example, the location and relative velocity of one or more objects within the environment. The apparatus includes an electronic circuit for converting environmental data into audible signal variables, for example using a mapping algorithm.

18 Claims, 6 Drawing Sheets

AUDITORY DISPLAY OF VEHICULAR ENVIRONMENT

FIELD OF THE INVENTION

The present invention relates to an apparatus and methods for conveying information regarding an environment to a person. In particular, it relates to the auditory display of the environment of a vehicle.

BACKGROUND OF THE INVENTION

Driving an automobile currently relies heavily on the visual capabilities of the driver. However, a variety of sensory and visuo-spatial attention limitations (such as blindness, or attention capacity limits) may limit the perceived visual information.

The human visual system provides a reduced field of view that must be carefully manipulated (through gaze shifts) and remembered (integration across gaze shifts) to create a representation of the full surrounding environment. In contrast to human visual abilities, the auditory sense provides rapid 360-degree feedback about the physical environment.

SUMMARY OF THE INVENTION

An apparatus for providing an audible signal representative of an environment to a person comprises a sensor system providing sensor data, an electronic circuit (such as a computer) receiving the sensor data and determining environmental data, for example in the form of a map of object locations, and an audio system, in communication with the electronic circuit, providing an audible signal to the person. The environmental data may include data relating to objects (object data), such as relative distance, direction (angle to the object relative to a reference direction), relative velocity, and acceleration of objects within the environment. The person is able to obtain detailed information about the environment through listening to the audible signal. The audible signal is therefore used to provide an auditory display of the environment, a sonic analog of a visual display.

The term "auditory display," as used herein, refers generally to any representation of an environment to a person using an audible signal. The audible signal may augment or replace information perceived through other senses, such as visual or haptic information.

The audible signal has one or more audible signal variables correlated with the environmental data. Hence, the person can perceive the location and/or motion of surrounding objects from the audible signal alone, without needing visual contact with the object. However, the audible information can be used to supplement a visual field of view. The person can perceive information from the environment behind them, or from blind spots, without having to change position.

An audible signal may have one or more audible signal variables such as: frequency, amplitude, modulation frequency, time delay from a reference time, modulation depth, amplitude envelope shape, tone pulse duration, and apparent direction of origin. Other possible audible signal variables include the pattern of tones within a tone packet, time-dependence of frequency (e.g. ascending or descending frequency), number of tones in a tone packet (sequentially and/or simultaneously), and the like.

The audible signal may comprise one or more tones. Here, a tone is a signal having a perceivable frequency. A tone pulse may be a tone having a perceivable duration. The frequency spectrum of a tone pulse may be broadened by the finite duration, and the term frequency may be used for the center frequency of the tone pulse. In some examples, tones have a time delay from a reference time (indicated by a click).

In some examples, the audible signal may include a plurality of tones pulses. The audible signal may comprise a continuous signal comprising a steady flow of tone pulses, or may be a sequence of separated tone pulses separated by intervals of silence. The environmental information can be mapped onto the frequency of the tone pulses, perceived duration of tone pulses, time interval between tone pulses, or time interval of a tone pulse from a reference sound (which may be another tone pulse, a click, or other sound). In other examples, multiple tone pulses having different frequencies may be presented simultaneously. Tone frequencies may be chosen to be in the human audible range, 20 Hz-20 kHz, or within a narrower range thereof. The tone pulse duration may put a lower limit on the tone frequency.

For an audible signal comprising a plurality of tone pulses, the audible signal may have one or more audible signal variables selected from: tone frequency, tone amplitude, time delay from a reference signal, tone pulse length, amplitude envelope shape, apparent direction of origin (for example, as determined by the signal balance between two or more speakers), tone length, tone separation, or other discernable feature of the audible signal.

For example, the audible signal may comprise a plurality of audible tones, the person determining the relative location of multiple objects within the environment from the amplitude and frequency of the audible tones. An audible signal variable may also be correlated with a velocity of an object relative to the person.

The environment may be a vehicle environment, and the sensor system may be associated with a vehicle operated by the person. The audible signal is used to increase the vehicle operator's awareness of the vehicle environment. Different signal variables, such as tone-pulse length, timing, amplitude, and frequency (pitch) can be used to encode different environmental data, such as the relative velocity and relative position of other vehicles or objects in the environment. The audible signal can also be used to convey other information, such as the current velocity of the vehicle, the approach of potential road hazards, and the like. Other information can be received, for example over a wireless network connection, and conveyed to the driver using the audible signal.

The vehicle may be a land vehicle, such as an automobile. In other examples, the environment may be remote from the person, for example in the case of a person guiding a remote vehicle through wireless signals.

The apparent direction of origin of the audible signal may correspond approximately to the actual direction of the object, the angle along which the object is located relative to a reference direction. The reference direction may correspond to straight ahead, behind the person, or some other direction may be chosen as desired. In some examples, the frequency and amplitude of an audible signal may correspond to the distance and angle to an object, or vice-versa.

The audio system may comprise a plurality of speakers arranged within a vehicle, for example speakers also used for an in-car entertainment system. In other examples, a person may wear a helmet containing a number of speakers, and receive information about the environment through an audible signal delivered through the speakers. The audio system may also be a pair of headphones or earpieces. The audible signal allows a person to have detailed awareness of a changing environment, which may supplement or replace information more conventionally received through different senses. For example, the audible signal may guide a person where no visual information is available, due to visual impairment, night conditions, fog, or other circumstance.

The audible signal can be complex, including various clicks and tone pulses, which may appear to originate from different directions, for example when using an audio signal comprising a plurality of speakers.

The sensor system may comprise one or more image sensors, such as one or more pairs of stereoscopic image sensors, so that the sensor data includes image data. The image data can be obtained from portions of the environment outside of a field of view of a vehicle operator, and may cover the entire surroundings of the vehicle. Image recognition may be used to select different audible signals according to the identity of an object in the environment. For example, a passenger car and truck may be mapped to audible signals having different parameters (such as loudness, tone sequence, or other parameter).

The sensor data may comprise a sequence of time-dependent sensor data sets, such as video frames. The electronic circuit may compare two or more successive sensor data sets, or location maps determined from the sensor data, to determine the relative velocity of an object. The audible signal then has a relative velocity dependent variable from which the person can determine the relative velocity.

Object relative velocity may be determined directly from relative velocity sensors, such as from Doppler shift measurement sensors. Additional sensors, such as acoustic sensors (sonar), electromagnetic sensors (radar, laser radar, LiDAR, and the like), or other passive and active sensing systems could be used (independently or in conjunction with each other) to facilitate knowledge of the environment to be represented by the auditory display.

The auditory display may be derived from a sensor system including one or more sensor types, such as video sensors (possibly including object recognition), IR sensors, radar, lidar, sonar, sub-sonic, or any other sensor or combination of sensors.

In examples of the present invention, an electronic circuit is used to transform sensor data into audible signal variables perceivable by a person. The electronic circuit may be a computer comprising a processor, memory, clock, or other components. The electronic circuit may also receive data from sources other than the sensor system, for example through a wireless communications network.

The audible signal may be divided into time sequential portions, which may be termed frames. Each frame provides a representation of the environment, and a person may perceive changes in the environment from listening to successive frames. The frame time may be chosen depending on the application. For slowly changing environments, the frame time may be relatively long, for example in the range 1-10 seconds.

For an audible signal provided to automobile operators, the frame time may be approximately 1 second or less, such as approximately in the range 0.05-0.5 seconds.

One or more audible signal variables may be used to represent environmental information concerning the environment, such as the number of objects therein. Audible signal variables may be used to represent information related to an object in the environment, such as distance (range), direction (e.g. angle relative to a reference direction), object size (such as the extent thereof), object identity, and the like.

The electronic circuit receiving sensor data may comprise image recognition software for recognition of the object identity. Object identities may be conveyed by the audible signal. For example, in automobile applications, the presence of a nearby truck may be conveyed by a first set of tones, and an automobile by a second set of tones. Similarly, cyclists, pedestrians, and static objects (such as trees) may by identified using different tone packets. In this context, a tone packet is a set of tones presented sequentially and/or simultaneously. The contents of a tone packet may also be correlated with object size, if determined.

The audible signal may be digital or analog. An analog system may be used to provide exact values for certain audible signal variables, but noise may be introduced in such a process.

The audible signal may also be used to convey additional data, such as lane deviation warnings, weather information, the presence of emergency vehicles, traffic information, navigation information, and the like. The sensor range may be limited by hardware, or by using an electronic circuit. Audible signals may not be provided for objects outside of a maximum range. For automotive applications, the maximum range may be reduced in directions extending away from the roadway (e.g. orthogonal to the vehicle direction).

A method for providing an audible signal representative of an environment to a person comprises collecting sensor data relating to the environment, and providing the audible signal to the person, wherein the audible signal has one or more audible signal variables correlated with the nature of environment. A person listening to the audible signal rapidly becomes aware of the position and relative motion of objects within the environment, which may be other vehicles in the case of a vehicle-based system. A person no longer has to take the visual focus from a forward direction to know what is happening to the rear and sides of the vehicle. If the auditory display also includes the forward portion of the vehicle, then the auditory display provides supplementary information about objects in front of the car that may also be within the visual field. When the gaze is forward this may be redundant, but if the head were temporarily turned to view something to the side or even behind the vehicle, the auditory display provides additional benefit by helping the vehicle operator to continue to gather information about the environment in front of the vehicle.

Other examples of the present invention can be used in aviation, for example to warn of other airplanes or ground hazards. Other examples include a system to help a person on foot to navigate in challenging conditions, such as at night. Sensors used may be sensitive to IR or other non-visible radiation, so that a person can become aware of their environment even in complete darkness.

DETAILED DESCRIPTION OF THE INVENTION

Providing an auditory channel to transmit environmental information to a person circumvents the limits of human visual capacities, and extends the types of information that can be explicitly represented to the person.

Examples of the present invention use non-verbal audible signals to convey environmental information to a person, such as the driver of an automobile. Environmental information can include the relative position and velocity of one or more objects in the spatial environment of the vehicle. Auditory information provides the person an additional representation of the vehicle environment which can supplement, or supplant, the conventional dependence of a person on visual information.

In embodiments of the present invention, distances and angles to objects within the environment of a vehicle are mapped to an audible signal. The audible signal may comprise tone pulses having a frequency, amplitude, or apparent direction of origin correlated with the relative location and relative velocity of the objects. An audible signal may have one or more audible signal variables representative of the location of extra-vehicular objects relative to the vehicle. The presentation in auditory space may include either only the areas outside of the driver's visual field of view, or a full 360 degrees around the driver in a horizontal plane.

Mapping of spatial information within the vehicle environment to audible signal variables can be determined either by user preference or an experimentally determined information mapping designed to take advantage of human auditory perceptual capabilities.

Audible signal variables may include tone frequency, amplitude (volume), delay from reference sound, and/or apparent direction of origin as determined from the balance between two or more speakers. Audible signal variables may be mapped to one or more relevant pieces of information about objects external to the system user.

An example of mapping is to use frequency to represent the distance to an external object, speaker balance to reproduce the direction to the detected object, and volume to indicate the velocity of the object relative to the system user. Other examples could exchange one of the representation variables for a privileged reference tone followed by a mapped delay to represent one of the variables to be presented. Other examples could include two or more simultaneously presented tones, where one or more are privileged references, while any others carry mapped information. As in the temporal space mapping, the explicitly presented difference in tone space (in this case presented as a tone combination) facilitates the estimate of distance in that space, and thereby facilitates the recognition and interpretation of the information from the mapped tones.

Several pieces of environmental information can be selected for presentation. Among those valuable for dynamic understanding are angle (direction to the object from the vehicle, relative to a defined zero angle direction), distance, size, and velocity of an object relative to a driver or vehicle. In addition to signals that explicitly represent size, size could also be represented as a range of signals all mapped from a single object in the environment to a set of tones presented in the display space.

Figure 1:
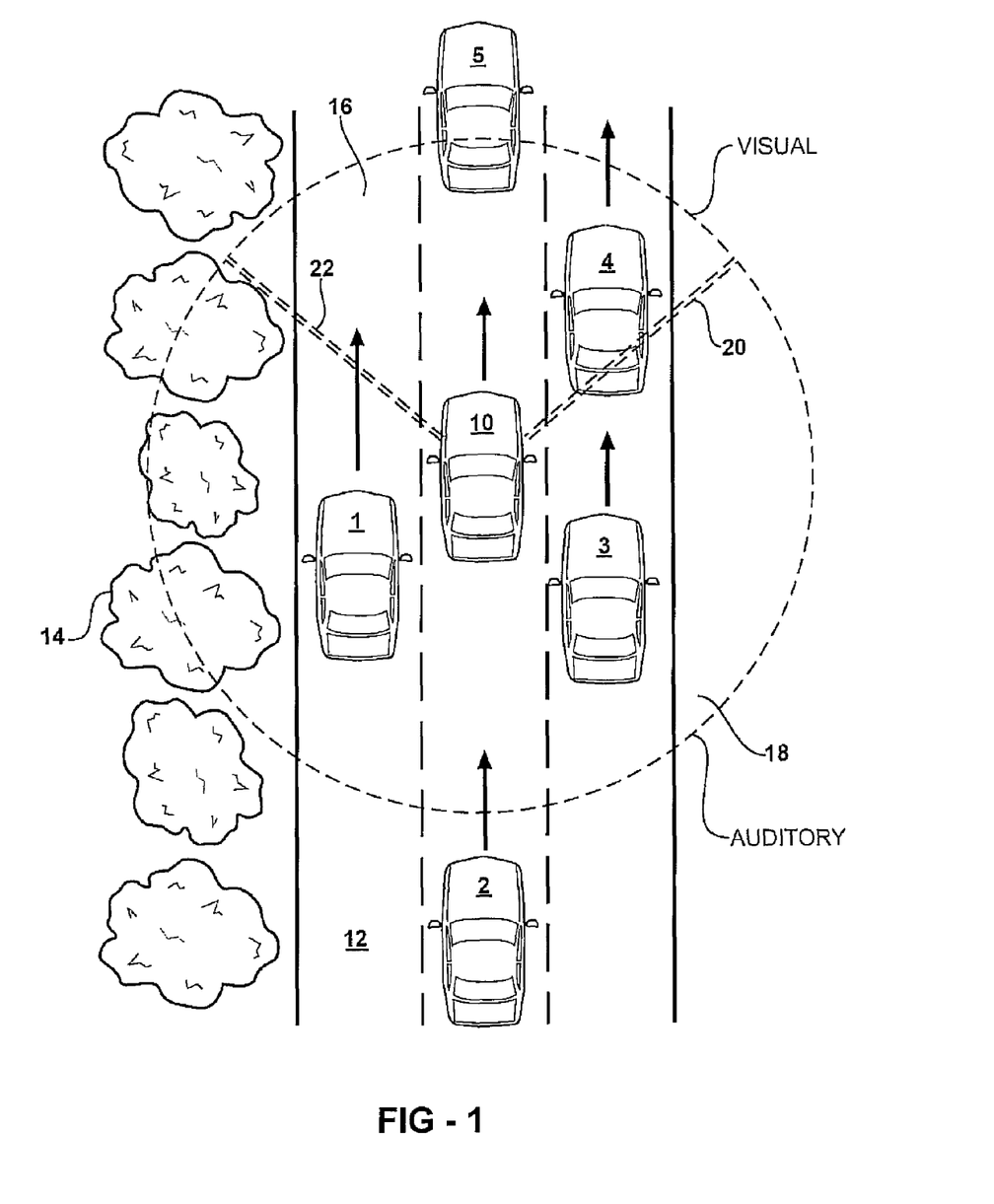
FIG. 1 illustrates an automobile moving along a road, and compares visual and auditory fields.

FIG. 1 illustrates an automobile 10 moving along road 12, lined with trees 14, surrounded by other automobiles 1, 2, 3, 4, and 5. Within a conventional visual field of view 16, bounded by visual field of view boundary 22, only vehicles 4 and 5 are visible. Vehicle 2 would be visible in a rear-view mirror, but only if the driver chooses to look in the mirror. Vehicles 1 and 3 are likely in a blind spot.

In this example, the auditory field surrounds the driver with a 360 degree angular coverage, including a large portion 18 (with boundary 20) that is not covered by the visual field of view. This portion 18 can be included as part of the range of auditory sweep around the head of the driver of the vehicle 10. In this context, auditory sweep refers to the angular range over which environmental information is mapped to one or more audible signal variables, which in this example is 360 degrees.

Alternatively, the auditory sweep may only cover a portion of the driver's surroundings outside the visual field of view, such as blind spots, or the rear and/or sides of the vehicle not within the visual field for a person looking in the direction of vehicle motion.

In an apparatus according to an embodiment of the present invention, the driver of the vehicle 10, which is in the middle of three lanes going the same direction, receives an audible signal (or signals) which represents the presence of vehicles outside of the visual field of view 16. In the situation illustrated in FIG. 1, an audible signal is provided that alerts the driver to the presence of vehicles 1-5. The audible signal changes with time in a way that is correlated with relative positional changes, for example indicating that a car is getting closer. The driver is able to recognize when another car is in a location that is dangerous to the driver's car, for example in driver's blind spot.

Figure 2A:
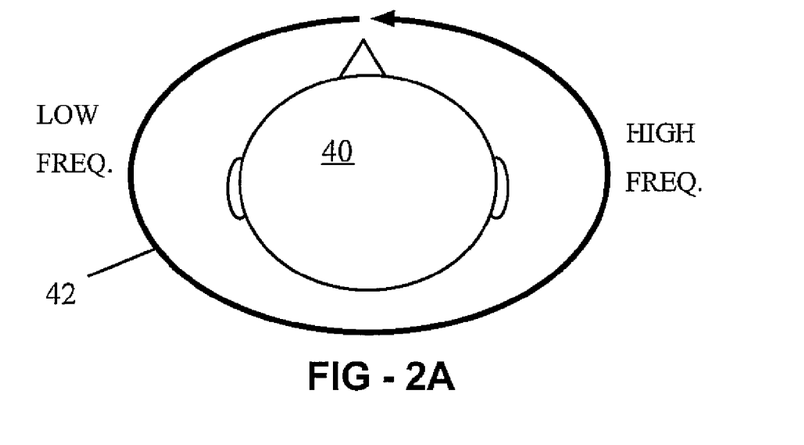
FIGS. 2A-2C illustrate mapping of environmental information from FIG. 1 to an audible signal.
Figure 2B:
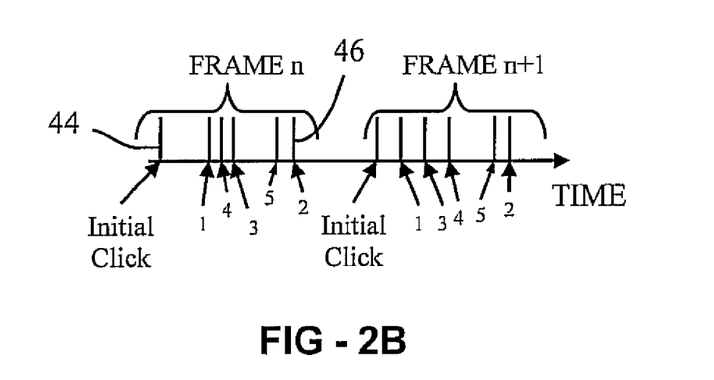
Figure 2C:
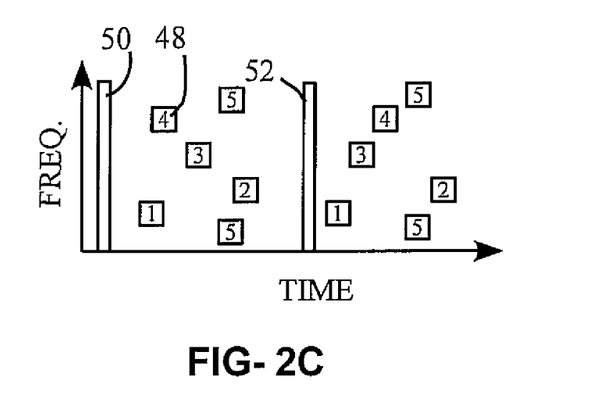

FIGS. 2A-2C illustrate a possible mapping of environmental information to auditory information received by a driver. FIG. 2A shows the head of a driver 40, and a representation of an auditory sweep around the head shown by an arrow 42. In this example, low frequencies correspond to objects towards the left of a reference direction straight ahead of the driver.

FIG. 2A shows the auditory sweep being 360 degrees around the driver's head, with lowest frequency and highest frequency at front-center location (the center of nose). In this case, car 5's pulse is just before car 2's in a frame n, and at a similar position in frame n+1. If an audible signal comprises a series of tones, low frequency tones represent vehicles to the left of the driver. This is only a representative example of using frequency as an audible signal variable to convey positional information (or relative velocity information) to a driver.

FIGS. 2B and 2C illustrate an example mapping of environmental information to an audible signal. In this representative example, the distance between the vehicle of a driver and another vehicle is converted into a time delay between an initial click and a tone. Hence, the audible signal comprises clicks and tones (in this example, tone pulses). A vehicle with portions on both sides of a reference direction (in this case straight ahead) may be represented by two frequencies.

FIG. 2B shows a time sequence of clicks such as 44 and tone pulses such as 46. The audible signal is divided into time-sequential frames, each frame starting with an initial click. The nth frame, to the left of FIG. 2B, comprises an initial click 44 followed by one tone pulse for each vehicle. Here, the tone pulses are labeled so as to correspond to the vehicles represented in the environment shown in FIG. 1. In this example, the time separation between the initial click and a tone pulse is correlated with the distance between the driver's vehicle and the vehicle to which the tone pulse corresponds, which may also be referred to as the range. The tone pulse 46 corresponds to vehicle 2, which is the furthest vehicle away. Hence, the time delay between the click and the tone is the longest of the five tone pulse representing the different vehicles.

For example, the tone pulses may have a duration of 0.01-0.1 seconds. In some examples, each vertical line in FIG. 2B may represent a packet of tone pulses presented substantially simultaneously to the person.

FIG. 2C is a two-dimensional representation of the audible signal, showing the time delay from the click along the horizontal axis representing distance (as shown in FIG. 2B). The frequency of the tone is correlated with angle shown along the vertical axis. In this example, zero angle may be arbitrarily defined to be the direction of radius 22 in FIG. 1, or alternatively be defined as straight ahead (the vehicle direction of travel), or defined in any other desired manner. Further, in this example, the angle to the object is measured anticlockwise. However, the direction of zero angle (or reference direction from the vehicle) and direction of increasing angle may be chosen in any desired manner. Hence, vehicle 1 has a smaller angle than vehicle 2 under this convention, and the representative tone has a lower frequency. The clicks 50 and 52 have wide spreads of frequencies and are represented as bars spanning a wide frequency range. Other sounds may be used in place of clicks.

In other examples, the angular range of the auditory information may be chosen so as to cover a range outside the visual range. For example, no audible signal may be provided for a vehicle fully within the visual range. In other examples, auditory information can be provided for any desired angular range, such as to cover blind spots. The covered angular range need not be continuous.

The auditory mapping can include mapping the angle to an object in the environment to a tone frequency, and distance to the object (along an angle represented by the frequency) by the delay of a tone pulse from a reference click. However, this is only a representative example. Any audible signal variable (such as frequency, amplitude, time delay from a reference signal, length of audible signal, modulation, amplitude envelope shape, and apparent direction of origin or speaker balance) can be used to represent some aspect of environmental information. For example, distance may be correlated with loudness (louder signals representing closer objects), frequency, or other audible signal variable.

Figure 3:
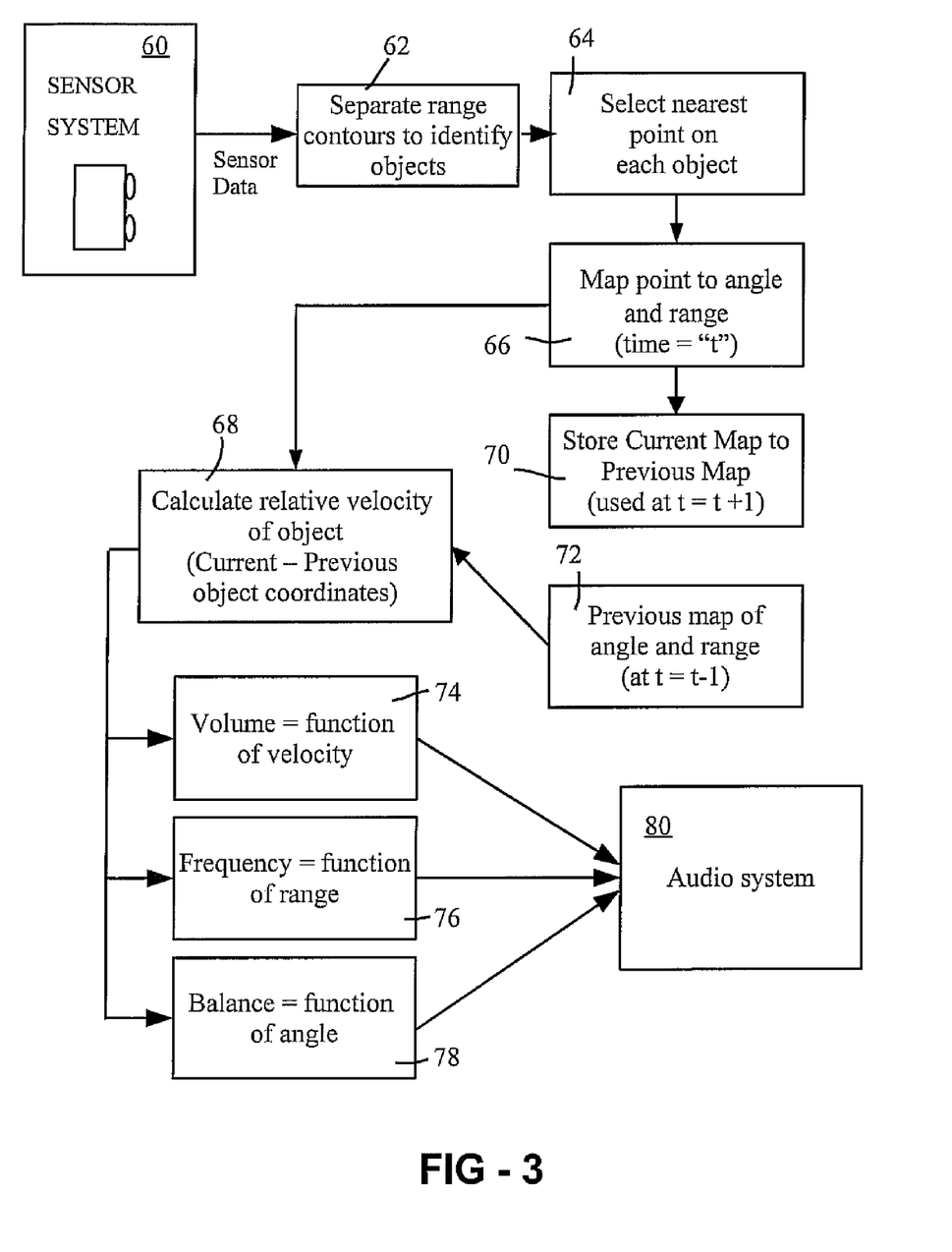
FIG. 3 illustrates a method of providing auditory information about an environment, including one possible mapping of information to acoustic signal properties.

Audible signals may comprise tone pulses that are short in duration relative to a particular frame of time over which information is presented. In other examples, audible signals may comprise longer (possibly continuous) tones that extend from the presentation of one piece of information to the next without interruption, although potentially with modifications reflecting changes of information from one frame of information presentation to the next. Using tone pulses, the delay of a tone pulse from a reference sound (such as a click), tone pulse sequence, tone pulse length, or other temporal information can be used to represent some aspect of an object location. The duration of the tone pulse can be selected for ease of human perception, and may be in the range of 0.01-1 seconds. The tone duration may also convey information, and longer tones may convey multiple pieces of information FIG. 3 is a schematic of a method for providing auditory information according to the present invention. In this example, the environment is a vehicle, such as an automobile. Box 60 represents a sensor system providing sensor data, for example a sensor system associated with an automobile. The sensor data may include range (distance) estimates to objects proximate to the vehicle.

The angular range of the sensors may be 360° within a plane parallel to the road surface. In other examples, such as an aircraft, the angular range of the environmental sensors may be spherical, or limited to regions outside a field of view. Ranges to surfaces may be determined, with additional post-processing included to convert from this sensed-surface data to identification of particular objects. Objects or object components in the environment may be specifically identified, and the identity conveyed by an auditory method. ff velocity information is presented to the driver, object tracking with or without identification may be used.

Box 62 represents separating range contours and determining object data relating to the objects. Object data includes the object distance (or range) and object angular location (angle) relative to the driver, and may optionally include determining object identity (such as another vehicle), object orientation, or other object data found from the sensor data. Optionally, the objects may be identified from the object data.

Box 64 represents selecting the nearest point for each distinct object. Box 66 represents mapping nearest points to a current map of the vehicle environment, including, for example, current distance and angle to each object.

Box 68 corresponds to comparing current data with stored data. Object velocity relative to the vehicle can be determined from the difference between the current and stored object coordinates. This corresponds to determination of the object location and relative velocity data $O_{i,t}(r, \phi, v)$, where $O_{i,t}$ represents the distance r, angle $\phi$, and velocity v for each object $O_i$ at time t. Velocity v is determined from position and angle data at time t and t−1, namely $O_{i,t}(r,\phi)$ and $O_{i,t-1}(r,\phi)$, respectively. In other approaches, Doppler sensors may be used to directly determine relative velocities.

Box 70 corresponds to storing current data, $O_{i,t}(r,\phi)$, which at a later time (t+1) (e.g. the next frame) becomes stored data for the comparison of Box 68. Box 72 corresponds to providing a stored previous map of distance and angle to each object for the comparison of Box 68. If velocity is known through other means (e.g. a Doppler sensor), then the elements 68, 70, 72 are not necessary.

Box 74 corresponds to mapping each distance $O_i(r)$ to a frequency $f_i$ for each object. Box 76 corresponds to mapping each velocity $O_i(v)$ to a sound volume or amplitude $A_i$. An amplitude function of the form $A_i = mO_i(v)+k$ can be used, where m is a coefficient and k is a constant, for example through use of a look-up table. Box 78 corresponds to mapping object angles to a speaker balance. Box 80 corresponds to providing the auditory information to the driver using an audio system.

In the example of the audio system comprising four speakers, the four speaker balance factors $b_{i,1}$, $b_{i,2}$, $b_{i,3}$, $b_{i,4}$ can determined from the angle $\phi_i$ using a look-up table, and the speaker balance factors used to calculate the signal to each speaker. A speaker signal $s_j$ for each speaker, representing each object i (i=1 to N) can be expressed as:

$$s_j = \sum_{i=0}^{N} b_{i,j} A_i \sin(f_i t) \qquad (1)$$

where b is a speaker balance factor (for object i and speaker j), A is amplitude, and f is tone frequency. An example apparatus using the method described above in relation to FIG. 3 maps range, orientation, and velocity relative to the driver's vehicle into tone frequency, speaker balance, and volume (respectively) of an audible signal.

Figure 4:
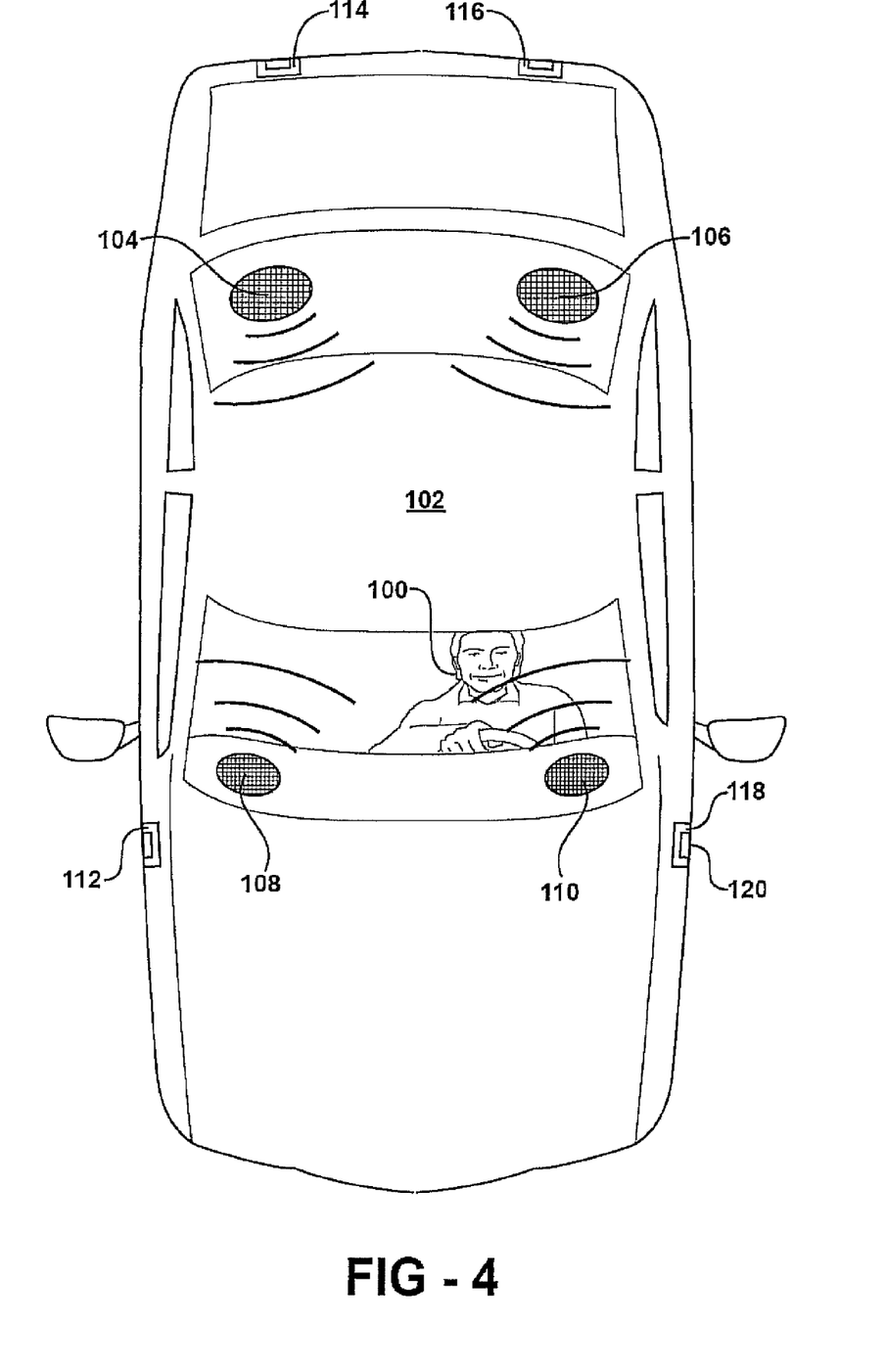
FIG. 4 illustrates possible locations for environmental sensors, and speakers of an audio system.

FIG. 4 illustrates a possible configuration for a passenger vehicle or car. The driver's head receives an audible signal through four speakers located within the passenger compartment of the car, speakers 104, 106, 103, 110. In this example, the car has image sensors supported on the body of the vehicle, at locations 112, 114, 116, and 118, the image sensors each comprising a lens system such as 120. A computation system, not shown, converts image data collected from the image sensors to an audible signal. Other sensor configurations may be used, for example an overhead camera located at the center top of the vehicle may be used. One or more forward-facing sensors may also be used.

The sensor system may comprise pairs of image sensors configured as stereo image sensors. Alternatively, one or more single sensors may be configured as a stereo image sensor. Other devices and configurations can be used. Sensors may be located at the front, side, and/or rear of the vehicle, or otherwise located to give a full 360° sensor coverage or other angular range desired. Object distance and size may be estimated using autofocus settings, a rangefinder, or other approach.

The sensor system may comprise one or more types of sensor, including image sensors, sensors for specific objects, distance sensors, relative velocity sensors, and the like. Objects within the environment may be provided with transmitters, transponders, reflective or other type of surface to assist detection and/or identification.

Figure 5:
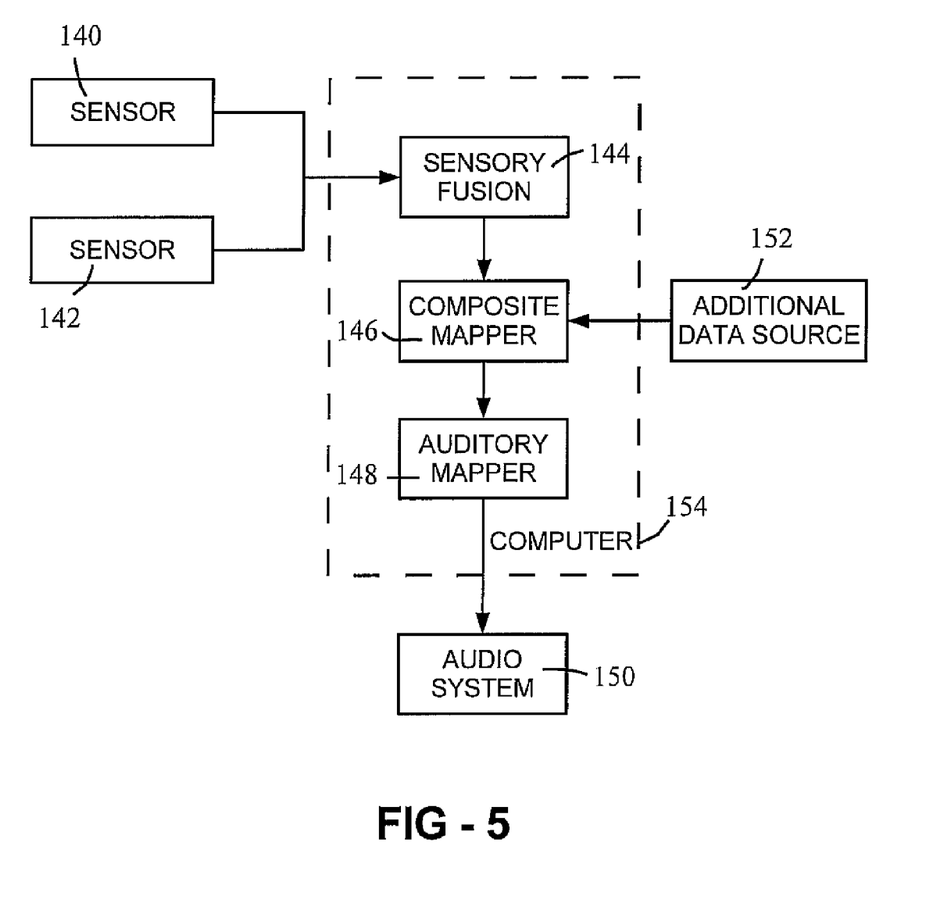
FIG. 5 is a schematic of a system according to an example of the present invention.

FIG. 5 is a schematic of an apparatus according to an embodiment of the present invention. The apparatus comprises image sensors 140 and 142, sensor fusion device (or multi-sensor processor) 144, composite situational mapper 146, auditory mapper 148, and audio system 150. In this example, the sensor fusion device, image processor and auditory mapper are provided by an electronic circuit 154. The audio system may comprise a sound synthesizer, amplifier, and a plurality of speakers such as shown in FIG. 4, which can be mounted within the passenger compartment of a vehicle. Alternatively, a sound synthesizer may be provided by the computer.

The electronic circuit 154, in this example a computer, receives sensor data from the sensors 140 and 142. The sensor fusion algorithm, executed by a processor within the computer, combines sensor data and determines environmental data, such as object location and angles (object data) within the environment.

The composite situational mapper 146 receives the environmental data, and also additional data from additional data source 152. The additional data source may comprise any other sensor, and may comprise a communications link to other devices. For example, the additional data source may include wireless network connection.

The auditory mapper 148 uses an audible mapping algorithm to determine audible signal variables, such as frequency, amplitude, or time delays, to convey object locations and relative velocities to a person through an audible signal. One or more look-up tables may be used, or values may be directly calculated according to some other relationship or equation between the information about the environment (such as object position or properties) to be presented, and the auditory signal variable of the sound to be produced by the audio system.

The audible signal variables are encoded in an electronic signal produced by the electronic circuit (such as a computer), and an audible signal provided by an audio system in communication with the electronic circuit. For example, the audio system may receive the electronic signal over a wired or wireless link to the electronic circuit.

The sensors may be optical image sensors, such as video cameras, and the sensor system may comprise one or more pairs of image sensors, each pair configured within a stereo arrangement. The sensors may include an optional sensor signal processor so as to provide processed sensor data to the image processor, or any required sensor signal processing may be provided by the computer. The image processor determines environmental data, including distance, angle, and velocity data for one or more objects within the environment, from time-sequential sensor data, for example, from one or more successive frames of image data. The auditory mapper 148 correlates audible signal variables, such as loudness and tone, with the environmental data. The audio system, which may include a sound synthesizer and one or more amplifiers, provide an audible signal to the driver, having audible signal variables. The image processor, auditory mapper, sound synthesizer, and other functions, such as alerts for a vehicle in a blind spot, may be provided by a single computation unit, for example comprising a processor executing a software program carrying out appropriate steps of the method discussed above in relation to FIG. 3.

Figure 6:
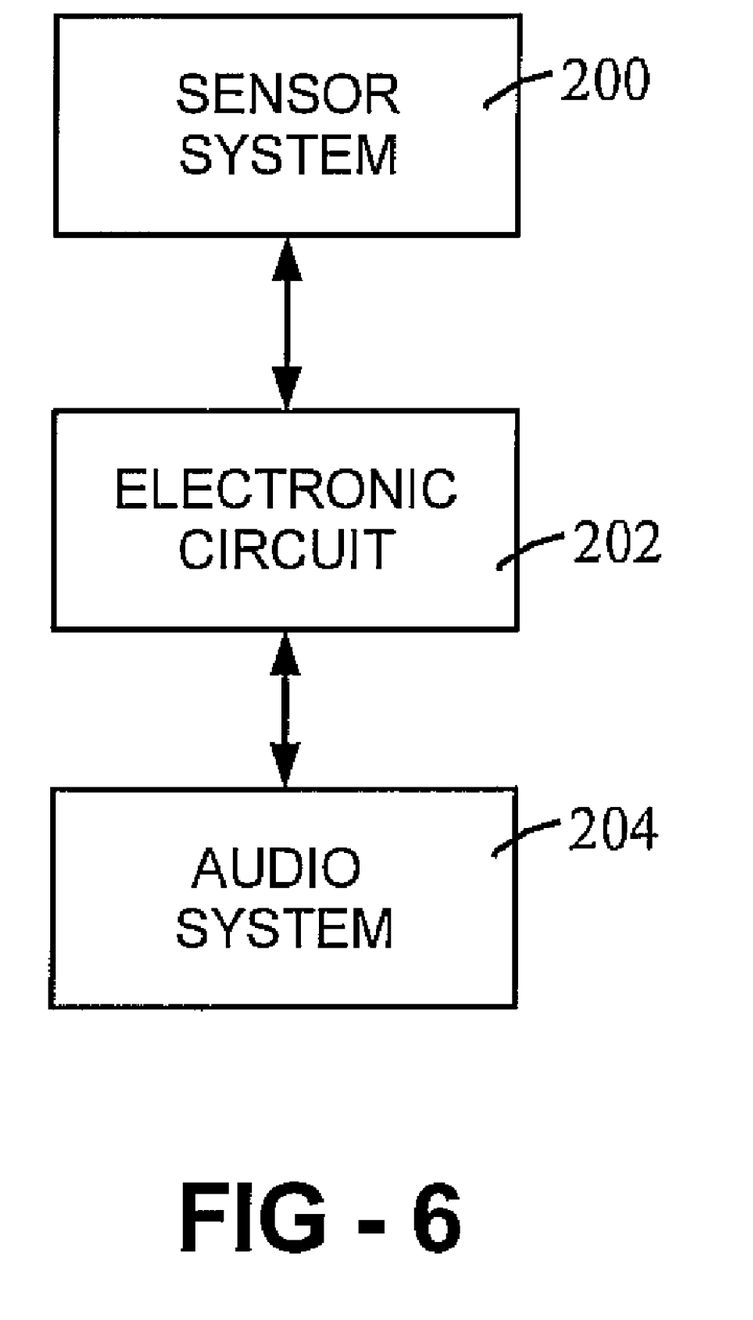
FIG. 6 is a further schematic of a system according to an example of the present invention.

FIG. 6 shows another schematic of a possible apparatus according to the present invention, comprising sensor system 200, electronic circuit 202, and audio system 204. The sensor system 200 provides sensor data, related to the environment, to the electronic circuit 202. The electronic circuit receives the sensor data and generates an electronic signal. The electronic signal is communicated to the audio system, which generates the audible signal heard by the person. The audio system may comprise loudspeakers (including headphones and the like), amplifiers or other circuitry, for example located within a vehicle and also used as a vehicle in-car entertainment center. The electronic circuit transforms the sensor data into an electronic signal encoding one or more audio signal variables.

Other Examples

The audible signal can be modified if a dangerous situation is present, for example if an object such as a car is present in the driver's blind spot. One or more of the audible signal variables, such as volume, can be changed. A distinct warning sound, such as a chime, can also be used. The warning sound may seem to originate from the direction of the hazardous condition, such as the position of a vehicle in a blind spot.

The audible signal may further include composite sounds, such as alternating sequence of tone frequencies. Composite sounds can be used as warnings, to represent turn signals of the vehicle or surrounding vehicles, or for other purposes, for example to identify an object within the environment. Composite sounds may also include chirped pulses, and the direction of chirp (increase or decrease in pitch) used to convey information.

A blind spot may be defined as being over a certain angular range. Optionally, a vehicle occupancy sensor, seat position sensor, head (or eye) position sensor, or other approach can be used to determine the relative positions of the driver's eyes, mirrors, and visual impediments in order to determine the location of blind spots. Alternatively, the angular range of blind spots may be entered into a system.

Driver training, for example using a driving simulator, can be used to allow the audible signal to be rapidly interpreted.

Objects can be optionally separated using distance contours. However, this is not required, as if objects cannot be separated structurally, they can be separated simply by angular resolution. A possible approach is providing tones corresponding to each resolved angular step.

A threshold distance (or horizon) may be selected, outside of which objects are not represented by the auditory information. In examples, a collision time can be estimated from a product of velocity component towards the vehicle and distance from the vehicle, and the auditory information correlated with a collision time estimate. No auditory information need be provided, or amplitude of an audible signal reduced, if there is no apparent possibility of collision, for example if the object is moving away from the vehicle, or if the estimated collision time is longer than a threshold value.

In examples of the present invention, sensor data from one or more sensors are interpreted so as to determine environmental data, which may include the relative location and relative velocity of one or more objects within the environment, or other information relating objects within the environment. Objects can include other vehicles, pedestrians, inanimate obstacles (such as trees or road signs), animals, and the like. The direction to the nearest part of an object, direction to the center of an object, angular subtended by an object at the location of the person, distance to the object, object angle, object velocity, relative object velocity, heading direction of an object (absolute and/or relative heading), object composition, and the like, can also be determined. Optical flow analysis, or other image analysis of sequential image data, may be used to determine relative velocity of objects within the environment.

Information encoded by the audible signal may also include ambient conditions such as temperature (air or road surface), visibility, roadway conditions (such as rough, wet, or icy roads), vehicle velocity over terrain, and the like.

A mapping process may be used to convert environmental information to an audible signal having audible signal variables that convey the environmental information to the driver. As a result of the mapping process, a person receives environmental information through listening to audio information. The mapping process may translate object angular position and distance relative to the person to an audible signal apparently arising from the same direction. For example, the volume or frequency of an audible signal can be used to represent proximity of an object.

Audible signal variables may include as tone frequency, stereophonic balance, quadraphonic balance, apparent direction of origin, volume, modulation, envelope shape (including rise and fall times), time delay from a reference sound, the pattern of a tone sequence, and/or pattern of tones presented simultaneously. For example, the reference sound, if used, may be a click. Audible information can include predetermined combinations of auditory variables, and may include multiple values of one or more signal variables, such as a multiple-tone signal. Signal variables may include the magnitude and time dependence of signal characteristics.

In other examples, other vehicles in the environment are represented by synthesized engine noises, for example having a frequency that increases with relative velocity. The frequency may also increase with absolute velocity, the speed of the driver's vehicle also being represented by an audible signal, allowing the driver to distinguish differences between his own velocity and that of surrounding vehicles. The frequency may alternatively contain frequency components suggested of Doppler shifts, for example high frequency components for vehicles approaching from behind. The apparent direction of the synthesized engine noise can be correlated with the actual location of a vehicle.

Environmental information may be determined using one or more environmental sensors, which may be mounted in or on a vehicle in one or more orientations. Environmental sensors may include imaging devices, including stereo imaging devices, video imaging, IR sensors, radar systems (including FMCW (frequency modulated continuous wave), AMCW, and laser radar), ultrasound sensors, capacitive sensors, inductive sensors and the like. Environmental sensors may receive radiation naturally received from an object (such as reflected ambient light), or may be combined with radiation transmitters (such as IR or ultrasound ranging systems). Environmental sensors may receive ambient radiation during the day, but operate in conjunction with radiation transmitters at dusk or at night.

Lane marking sensors can be used to determine the direction of vehicle lanes. The determined lane configuration can be used to predict the future motion of objects. The determined lane configuration can also be compared with steering inputs to the vehicle to determine if a lane change is imminent, and the audible signal modified the vehicle is entering a lane occupied by a second vehicle. The audible signal can be modified to include collision warning signals in addition to a representation of the vehicle environment.

Other vehicle data may be determined, such as vehicle velocity from a vehicle velocity sensor, vehicle position from a GPS, location of surrounding objects from an external monitoring system (such as a radar system), steering signals, and the like. Vehicle data may be encoded in the audible signal by mapping to an audible signal variable.

Environmental information can also be received from emergency warning systems, other vehicles, fixed sensor networks, over communications networks, and the like. For example, a wireless communication link can be established between the vehicle and a remote source of environmental information. The driver can be warned about, for example, imminent weather hazards, hazardous conditions approaching but not yet detectable by the environmental sensors, law enforcement or emergency vehicle approaches, and the like. Special audible signals can be used for emergency or hazardous conditions.

An audible signal is transmitted to the person using one or more audio devices, such as one or more speakers. In the example of an automobile, one or more speakers may be located within the passenger compartment. These may be the same speakers used with an in-car entertainment device, such as a radio. In other examples, the person may wear or otherwise carry an audio device, such as an earpiece, headphones (with one or two speakers), or other device.

In other examples, vibrational transducers, in place of or in addition to audio devices, may be located so as to be sensed by the person. For example, vibrations may be transmitted to a person by a seat, steering wheel, wristband or other body-supported device, and the like. One or more vibrational signal variables may be used in an equivalent manner to an audible signal variable.

Examples of the present invention can be implemented in relation to any vehicle, including land vehicles (automobiles and the like, including bicycles and motorcycles), boats, submarines, aircraft, spacecraft, and the like. Apparatus can be used with powered or unpowered vehicles. Examples of the present invention can be used to present radar or sonar data to a person, for example to an air-traffic controller. Other applications may include improved operation of agricultural vehicles, such as crop planting, harvesting, and spraying equipment. In such examples, auditory information presented to the operator of an agricultural vehicle may be correlated with vehicle direction (for example in relation to crop row orientation), distance to fences, distance to other objects, such as vehicles operating in the same field, workers on foot, boulders, and the like. Examples of the present invention can be used to assist pilots, for example by presenting audible signals representative of an airplane environment in three dimensions. Information such as the relative location of proximate airplanes, collision hazards (with other airplanes, terrain, or towers, proximate hazardous conditions, and the like) can be mapped to one or more audible signal variables.

Examples of the present invention can be used with a GPS or other positioning system and a database of hazard locations to allow the relative locations of hazards to be presented without the need for detection and recognition by vehicle sensor systems. Other vehicles may provide absolute location to a central database or other computer system, and these locations used to provide relative positional feedback. A vehicle may have a wireless communications link through which location of other vehicles, hazards, or other environmental aspects can be received.

Examples of the present invention can also be used to assist the movement of pedestrians, such as police, military personnel, or the visually impaired, through a potentially hazardous environment. A person may wear a helmet having one or more audio devices (such as headphones), and may carry or otherwise have associated with them a sensor system.

Examples of the present invention may allow visually impaired to operate a motor vehicle, or move confidently on foot through an unfamiliar environment.

Roads can be constructed to include features readily detected by the sensor system of a vehicle, to allow environmental data to include lane position and direction changes, the position of the person's vehicle within a lane, steering input required to stay in lane, presence of other vehicles relative to their lanes, vehicles partially out of a lane, or other information. For example, road markings may use special paint, include embedded magnets, radio transponders, RFID elements, or other materials.

Non-verbal auditory information provided by examples of the present invention can be combined with verbal warnings (for example, of imminent hazards) if desired, and with blind-spot warning, collision warning, or other alert systems.

Examples of the present invention may present information obtained from visual imaging, or imaging in other spectral ranges, such as IR or UV or other frequencies above and below the visual spectrum. In other examples, a person's control of a remote vehicle or other device may be assisted by receiving auditory information relating to the environment of the remote device, for example the piloting of a remote control plane, positional feedback to a surgeon during surgery, control of vehicle or other device within a simulated environment (such as a computer game), and the like.

The invention is not restricted to the illustrative examples described above. Examples are not intended as limitations on the scope of the invention. Methods, apparatus, compositions, and the like described herein are exemplary and not intended as limitations on the scope of the invention. Changes therein and other uses will occur to those skilled in the art. The scope of the invention is defined by the scope of the claims.

Patents, patent applications, or publications mentioned in this specification are incorporated herein by reference to the same extent as if each individual document was specifically and individually indicated to be incorporated by reference.

Having described our invention, I claim:

1. An apparatus for providing an audible signal representative of a vehicle environment to a vehicle operator within a vehicle, the environment including an object having a location and a relative velocity, the apparatus comprising:
    a sensor system, providing sensor data related to the vehicle environment, the sensor system being supported by the vehicle;
    an electronic circuit receiving the sensor data, the electronic circuit determining a plurality of audible signal variables from the sensor data; and
    an audio system comprising a plurality of speakers within the vehicle, the audio system providing the audible signal having the audible signal variables,
    wherein each audible signal variable conveys information about the vehicle environment,
    the audible signal including a plurality of tone pulses, each tone pulse having audible signal variables allowing perception of the location and the relative velocity of the object,
    the audible signal variables being selected from a group of variables consisting of: frequency, amplitude, time delay from a reference time, and tone pulse duration.

2. The apparatus of claim 1, the time delay from a reference time being correlated with object position.

3. A method for providing information about an environment to a person, the environment including an object having an object location and a relative velocity, the method comprising:
    sensing the environment using a sensor system;
    receiving sensor data from the sensor system;
    transforming the sensor data into an audible signal; and
    providing the audible signal to the person so as to provide information about the environment to the person,
    the audible signal including a plurality of tone pulses, each tone pulse having audible signal variables correlated with the location and the relative velocity of the object within the environment so as to allow perception of the location and the relative velocity of the object,
    the audible signal variables being selected from a group of variables consisting of: frequency, amplitude, time delay from a reference time, and duration.

4. The method of claim 3, the frequency being correlated with a direction to the object.

5. The method of claim 3, the amplitude and frequency of the tone pulse allowing determination of the relative location of the object.

6. The method of claim 5, the duration of the tone pulses being between 0.01 and 1 seconds.

7. The method of claim 3, wherein the audible signal is provided by a plurality of speakers,
    the audible signal including tones having an apparent direction of origin correlated with the object location.

8. The method of claim 3, wherein the object location comprises an object distance and an object direction, and
    the audible signal has a first audible signal variable correlated with the object distance and a second audible signal variable correlated with the object direction.

9. The method of claim 3, wherein the person is an operator of a vehicle.

10. The method of claim 9, wherein the vehicle is an automobile.

11. An apparatus operable to provide an audible signal representative of an environment of a vehicle, the environment including a plurality of objects, the apparatus comprising:
    a sensor system, providing sensor data related to the environment;
    an electronic circuit, operable to receive the sensor data and to generate an electronic signal, the electronic signal encoding audible signal variables representative of the environment; and
    an audio system in communication with the electronic circuit, the audio system operable to generate an audible signal,
    the audible signal comprising a plurality of tone pulses,
    each tone pulse having an audible signal variable correlated with an object location within the environment,
    the plurality of tone pulses allowing perception of the object location for each of a plurality of objects within the environment,
    at least one of the audible signal variables being selected from a group of variables consisting of tone pulse frequency, tone pulse duration, tone pulse amplitude, and time delay from a reference time, each tone pulse having audible signal variables allowing perception of an object distance, an object direction relative to a reference direction, and an object velocity relative to the vehicle.

12. The apparatus of claim 11, wherein the audible signal comprises tone pulses having tone pulse durations of between 0.01 and 1 seconds.

13. The apparatus of claim 11, wherein the audio system is located within the vehicle, the audio system comprising one or more speakers.

14. The apparatus of claim 11, wherein the sensor system comprises at least one stereoscopic image sensor.

15. The apparatus of claim 11, wherein the audible signal comprises a time-sequential set of frames, the plurality of tone pulses being presented in each frame.

16. The apparatus of claim 15, wherein the audible signal further includes a reference sound presented at the beginning of each frame.

17. An apparatus operable to provide an audible signal representative of an environment of a vehicle, the environment including a plurality of objects, the apparatus comprising:

a sensor system, providing sensor data related to the environment;

an electronic circuit, operable to receive the sensor data and to generate an electronic signal, the electronic signal encoding audible signal variables representative of the environment; and an audio system in communication with the electronic circuit, the audio system operable to generate an audible signal, the audible signal comprising a plurality of tone pulses, each tone pulse having an audible signal variable correlated with an object location within the environment, the plurality of tone pulses allowing perception of the object location for each of a plurality of objects within the environment, the audible signal variables being selected from a group of variables consisting of tone pulse frequency, tone pulse duration, tone pulse amplitude, and time delay from a reference time, each tone pulse having a first audible signal variable correlated with an object distance, and a second audible signal variable correlated with an object direction, the object direction being an angle relative to a reference direction.

18. An apparatus operable to provide an audible signal representative of an environment of a vehicle, the environment including a plurality of objects, the apparatus comprising:

a sensor system, providing sensor data related to the environment;

an electronic circuit, operable to receive the sensor data and to generate an electronic signal, the electronic signal encoding audible signal variables representative of the environment; and an audio system in communication with the electronic circuit, the audio system operable to generate an audible signal, the audible signal comprising a plurality of tone pulses, each tone pulse having an audible signal variable correlated with an object location within the environment, the plurality of tone pulses allowing perception of the object location for each of a plurality of objects within the environment, at least one of the audible signal variables being selected from a group of variables consisting of tone pulse frequency, tone pulse duration, tone pulse amplitude, and time delay from a reference time, the tone pulse frequency being a tone pitch within an audible frequency range of between 20 Hz and 20 kHz, the tone pulse frequency of each tone pulse being correlated with an object direction.

* * * * *